US012581420B2

(12) United States Patent
Wu

(10) Patent No.: US 12,581,420 B2
(45) Date of Patent: Mar. 17, 2026

(54) COMMUNICATION METHOD, TERMINAL DEVICE, AND STORAGE MEDIUM

(71) Applicant: GUANGDONG OPPO MOBILE TELECOMMUNICATIONS CORP., LTD., Dongguan (CN)

(72) Inventor: Zhongchen Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 295 days.

(21) Appl. No.: 18/328,639

(22) Filed: Jun. 2, 2023

(65) Prior Publication Data

US 2023/0309020 A1 Sep. 28, 2023

Related U.S. Application Data

(63) Continuation of application No. PCT/CN2021/129386, filed on Nov. 8, 2021.

(30) Foreign Application Priority Data

Dec. 11, 2020 (CN) .......................... 202011468548.0

(51) Int. Cl.
H04W 52/14 (2009.01)
H04W 52/36 (2009.01)

(52) U.S. Cl.
CPC ......... H04W 52/14 (2013.01); H04W 52/367 (2013.01)

(58) Field of Classification Search
CPC ............................ H04W 52/04; H04W 52/367
See application file for complete search history.

(56) References Cited

U.S. PATENT DOCUMENTS

| | | | | |
|---|---|---|---|---|
| 2009/0143012 A1* | 6/2009 | Jeon | ...................... | H04W 52/50 |
| | | | | 455/574 |
| 2013/0115900 A1 | 5/2013 | Zhu | | |
| 2014/0024409 A1 | 1/2014 | Zhang et al. | | |
| 2018/0199214 A1 | 7/2018 | Shen | | |

(Continued)

FOREIGN PATENT DOCUMENTS

| | | |
|---|---|---|
| CN | 101132206 A | 2/2008 |
| CN | 101938284 A | 1/2011 |
| CN | 102076075 A | 5/2011 |

(Continued)

OTHER PUBLICATIONS

European Search Report from the corresponding European Patent Application No. 21902303.3, mailed Feb. 5, 2024 (8 pages).

(Continued)

*Primary Examiner* — Brenda H Pham
(74) *Attorney, Agent, or Firm* — Ladas & Parry, LLP

(57) ABSTRACT

Disclosed in the present disclosure are a communication method, a terminal device, and a storage medium. The method includes: monitoring a communication scenario between the smart wearable device and the communication counterpart device after a Bluetooth connection between the smart wearable device and the communication counterpart device is established; selecting a preset power based on the communication scenario; and transmitting scene data between the smart wearable device and the communication counterpart device based on the preset power.

16 Claims, 2 Drawing Sheets

(56)                      References Cited

U.S. PATENT DOCUMENTS

| | | |
|---|---|---|
| 2021/0377204 A1 | 12/2021 | Sachidanandam et al. |
| 2022/0124643 A1 | 4/2022 | Wang et al. |

FOREIGN PATENT DOCUMENTS

| | | |
|---|---|---|
| CN | 109005582 A | 12/2018 |
| CN | 109032246 A | 12/2018 |
| CN | 109479241 A | 3/2019 |
| CN | 111757303 A | 10/2020 |
| CN | 112601207 A | 4/2021 |
| WO | 2017074828 A1 | 5/2017 |
| WO | 2022121596 A1 | 6/2022 |

OTHER PUBLICATIONS

Chinese First Office Action and search report of the corresponding Chinese Application No. 202011468548.0, mailed Dec. 15, 2022.
International Search Report of the International Application No. PCT/CN2021/129386, mailed Feb. 9, 2022.
Written Opinion of the International Searching Authority in International Application No. PCT/CN2021/129386, mailed Sep. 2, 2022.
Chinese First Office Action from corresponding Chinese patent Application No. 202310861425.0, mailed Jan. 21, 2026, with search report (15 pages).

* cited by examiner

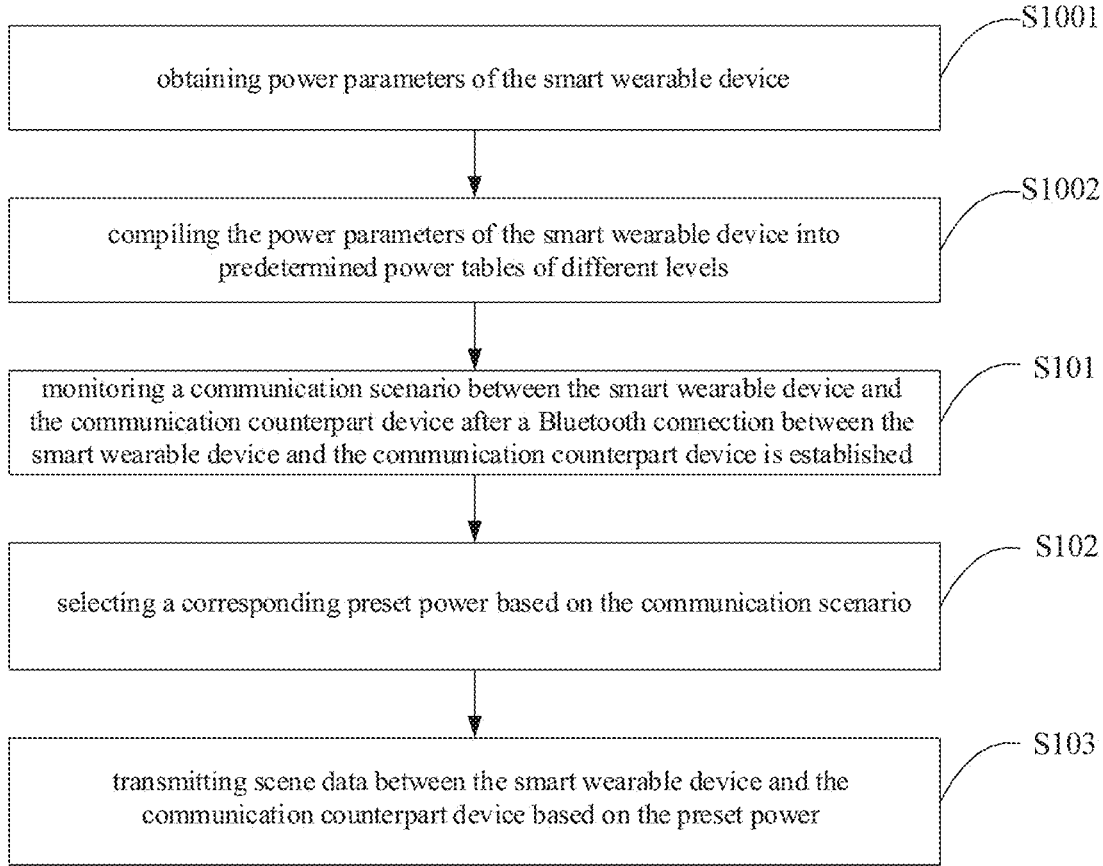

obtaining power parameters of the smart wearable device — S1001 compiling the power parameters of the smart wearable device into predetermined power tables of different levels — S1002 monitoring a communication scenario between the smart wearable device and the communication counterpart device after a Bluetooth connection between the smart wearable device and the communication counterpart device is established — S101 selecting a corresponding preset power based on the communication scenario — S102 transmitting scene data between the smart wearable device and the communication counterpart device based on the preset power — S103

FIG. 4

COMMUNICATION METHOD, TERMINAL DEVICE, AND STORAGE MEDIUM

CROSS REFERENCE

The present disclosure is a continuation-application of International (PCT) Patent Application No. PCT/CN2021/129386, filed on Nov. 8, 2021, which claims priority of Chinese Patent Application No. 202011468548.0, filed on Dec. 11, 2020, the entire contents of which are hereby incorporated by reference in their entireties.

TECHNICAL FIELD

The present disclosure relates to the field of communication technologies, and in particular to a communication method, a terminal device, and a storage medium.

BACKGROUND

With the development of smart mobile terminal technology, various smart wearable devices, such as smart bracelets and smart watches, have come into being. Smart wearable devices can generally communicate with the communication counterpart devices by Bluetooth, and the Bluetooth power consumption of the smart wearable devices will affect their battery life.

In the related art, the value of the transmitting power of a smart watch is determined by a request signal of a Bluetooth device with which the smart watch communicates, and when the request signal requests the maximum power, the smart watch transmits the signal at the maximum power. The defect of the relevant art is that: the smart watch is a wearable device, which is extremely sensitive to power consumption; further, it is not taken into account that many Bluetooth devices on the market do not comply with the power request rule, and these Bluetooth devices request the smart watch to transmit at the maximum power regardless of whether the signal is good or not, which will result in high-power consumption of the watch and have a great impact on the battery life thereof.

SUMMARY OF THE DISCLOSURE

The main purpose of the present disclosure is to provide a communication method, terminal device, and storage medium.

To achieve the above, embodiments of the present disclosure provide a communication method, performed by a smart wearable device and including: monitoring a communication scenario between the smart wearable device and the communication counterpart device after a Bluetooth connection between the smart wearable device and the communication counterpart device is established; selecting a preset power based on the communication scenario; and transmitting scene data between the smart wearable device and the communication counterpart device based on the preset power.

In addition, a terminal device is provided, including: a memory, a processor, and a communication program stored in the memory and executable by the processor; wherein when executed by the processor, the communication program realizes the communication method as above.

In addition, a computer-readable storage medium is provided, storing a communication program; wherein when executed by the processor, the communication program realizes the communication method as above.

BRIEF DESCRIPTION OF THE DRAWINGS

FIG. 4 is a flowchart of a communication method according to another embodiment of the present disclosure.

Figure 1:
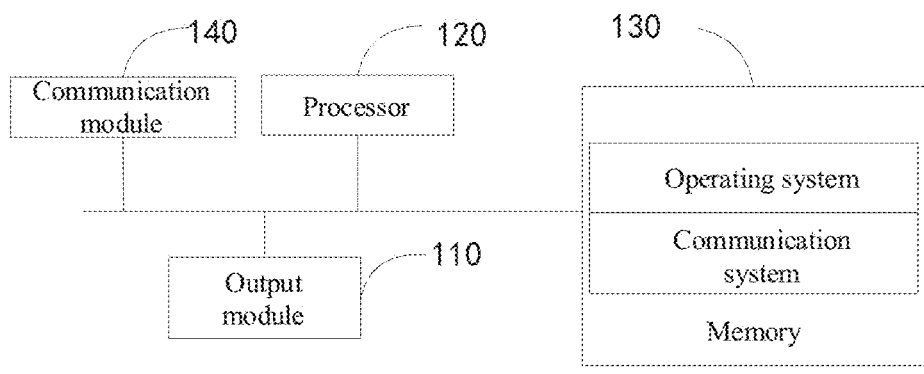
FIG. 1 is a schematic view of functional modules of a terminal device to which a communication device belongs according to an embodiment of the present disclosure.

The realization of the purpose, functional features, and advantages of the present disclosure will be further described with reference to the accompanying drawings in conjunction with the embodiments.

DETAILED DESCRIPTION

It should be understood that the specific embodiments described herein are intended only to explain the present disclosure and are not intended to limit the present disclosure.

The main solution of the embodiments of the present disclosure is: after a Bluetooth connection is established between a smart wearable device and a communication counterpart device, monitoring a communication scenario between the smart wearable device and the communication counterpart device; selecting a corresponding preset power according to the communication scenario; and transmitting scene data between the smart wearable device and the communication counterpart device based on the preset power. By virtue of the above technical solution, the power may be controlled at the smart wearable device end, where different preset powers may be determined in response to different use scenarios, instead of the communication counterpart device controlling the power of the smart wearable device, thereby reducing the Bluetooth power consumption of the smart wearable device and improving the battery life, while avoiding the audio lag caused by inappropriate power selection.

The embodiments of the present disclosure take into account that the power consumption of the smart wearable device depends mainly on the Bluetooth transmitting power. In relevant programs, the maximum power is tuned through radio frequency and compiled by software into different power levels according to the power magnitude. In actual use processes, the magnitude of the transmitting power of the smart wearable device is determined by a request signal of a Bluetooth device with which the smart wearable device communicates, and when the request signal requests the maximum power, the smart wearable device transmits the signal according to the maximum power. The defect of this scheme is that: the smart watch is a wearable device, which is extremely sensitive to power consumption; further, it is not taken into account that many Bluetooth devices on the market do not comply with the power request rule, and these Bluetooth devices request the smart watch to transmit at the maximum power regardless of whether the signal is good or not, which will result in high-power consumption of the watch and have a great impact on the battery life thereof.

The premise that the communication counterpart device can request the maximum Bluetooth power of the smart wearable device is that the maximum Bluetooth power of the smart wearable device is visible to the communication counterpart device. Therefore, based on the above considerations, the embodiments of the present disclosure propose a solution that can compile the power of transmitting data of the smart wearable device into power tables of different levels, where only the power table of a corresponding level can be requested for different scenarios use state. Even if some Bluetooth devices do not request data according to the rules, the transmitting power of the smart wearable device will not exceed a maximum power of the power table of the corresponding level, such that the Bluetooth power consumption of the smart wearable device may be reduced and the battery life thereof may be improved.

In some embodiments, referring to FIG. 1, FIG. 1 is a schematic view of functional modules of a terminal device to which a communication device belongs according to an embodiment of the present disclosure. The communication device may be a device capable of data processing independent of the terminal device and may be carried on the terminal device in the form of hardware or software. The terminal device may be a smart watch, a smart bracelet, and other smart wearable devices, and may be a mobile terminal such as a mobile phone or a tablet computer. The smart watch, smart bracelet, and other smart wearable devices is capable of communicating with a communication counterpart device by means of Bluetooth, and the communication counterpart device may be an electronic device such as a Bluetooth headset, a mobile phone, a tablet computer, and other wearable Bluetooth devices.

In the embodiments, the terminal device to which the communication device belongs includes at least an output module 110, a processor 120, a memory 130, and a communication module 140.

The memory 130 stores an operating system and a communication program, and the communication device may store monitored communication scenario between the smart wearable device and the communication counterpart device, preset power, scene data transmitted between the smart wearable device and the communication counterpart device, and other information in the memory 130; the output module 110 may be a display, a speaker, etc. The communication module 140 may include a Wi-Fi module, a mobile communication module, and a Bluetooth module, etc., through which the communication module 140 communicates with an external device or a server.

In an implementation, the communication program in memory 130 is executed by the processor to achieve the following operations.

> monitoring a communication scenario between the smart wearable device and the communication counterpart device after a Bluetooth connection between the smart wearable device and the communication counterpart device is established.
>
> selecting a corresponding preset power based on the communication scenario.
>
> transmitting scene data between the smart wearable device and the communication counterpart device based on the preset power.

In some embodiments, the communication program in memory 130 is executed by the processor to further achieve the following operations.

> selecting a corresponding first-level power table in response to the communication scenario being a predetermined high-power application communication scenario.
>
> selecting a corresponding second-level power table in response to the communication scenario being a pre- > determined low-power application communication scenario, where a maximum power in a power range of the first-level power table is greater than a maximum power in a power range of the second-level power table.

In some embodiments, the communication program in memory 130 is executed by the processor to further achieve the following operations.

> selecting a default power table in response to the communication scenario being the predetermined high-power application communication scenario, where a maximum power in a power range of the default power table is less than the maximum power in the power range of the first-level power table.
>
> sending a scene data test packet to the communication counterpart device at the maximum power in the power range of the default power table in response to the smart wearable device receiving a maximum power request signal from the communication counterpart device.
>
> performing the selecting a corresponding first-level power table in response to the smart wearable device not receiving response data from the communication counterpart device within a predetermined time.

In some embodiments, the communication program in memory 130 is executed by the processor to further achieve the operations.

> continuing to send the scene data to the communication counterpart device at the maximum power in the power range of the default power table in response to the smart wearable device receiving the response data from the communication counterpart device within the predetermined time.

In some embodiments, the communication program in memory 130 is executed by the processor to further achieve the operations.

> obtaining a power request signal received by the smart wearable device and sent by the communication counterpart device in response to the corresponding first-level power table being selected.
>
> selecting the maximum power in the power range of the first-level power table in response to the power request signal sent by the communication counterpart device being the maximum power request signal.
>
> sending the corresponding scene data to the communication counterpart device at the maximum power in the power range of the first-level power table.

In some embodiments, the communication program in memory 130 is executed by the processor to further achieve the operations.

> obtaining the power request signal received by the smart wearable device and sent by the communication counterpart device in response to the corresponding second-level power table being selected.
>
> selecting the maximum power in the power range of the second-level power table in response to the power request signal sent by the communication counterpart device being the maximum power request signal.
>
> sending the corresponding scene data to the communication counterpart device at the selected maximum power in the power range of the second-level power table.

In some embodiments, the communication program in memory 130 is executed by the processor to further achieve the operations.

> obtaining power parameters of the smart wearable device.
>
> compiling the power parameters of the smart wearable device into predetermined power tables of different levels.

In some embodiments, the communication program in memory 130 is executed by the processor to further achieve the operations.

after monitoring a change in the communication scenario between the smart wearable device and the communication counterpart device, selecting a corresponding preset power according to the changed communication scenario and transmitting the scene data between the smart wearable device and the communication counterpart device based on the preset power.

By virtue of the above scheme, after a Bluetooth connection is established between a smart wearable device and a communication counterpart device, a communication scenario between the smart wearable device and the communication counterpart device is monitored; a corresponding preset power is selected according to the communication scenario; and scene data is transmitted between the smart wearable device and the communication counterpart device based on the preset power. By the above technical solution, the power may be controlled at the smart wearable device end, where different preset powers may be determined in response to different use scenarios, instead of the communication counterpart device controlling the power of the smart wearable device, thereby reducing the Bluetooth power consumption of the smart wearable device and improving the battery life, while avoiding the audio lag caused by inappropriate power selection.

Based on the above terminal device architecture but not limited to the above architecture, the embodiments of the present disclosure further propose a method.

The execution subject of the method of the embodiments may be an apparatus independent of the terminal device, capable of data processing device, and carried on the terminal device in the form of hardware or software. The terminal device may be a smart watch, smart bracelet, and other smart wearable devices, or a mobile phone, a tablet PC, and other mobile terminals.

Figure 2:
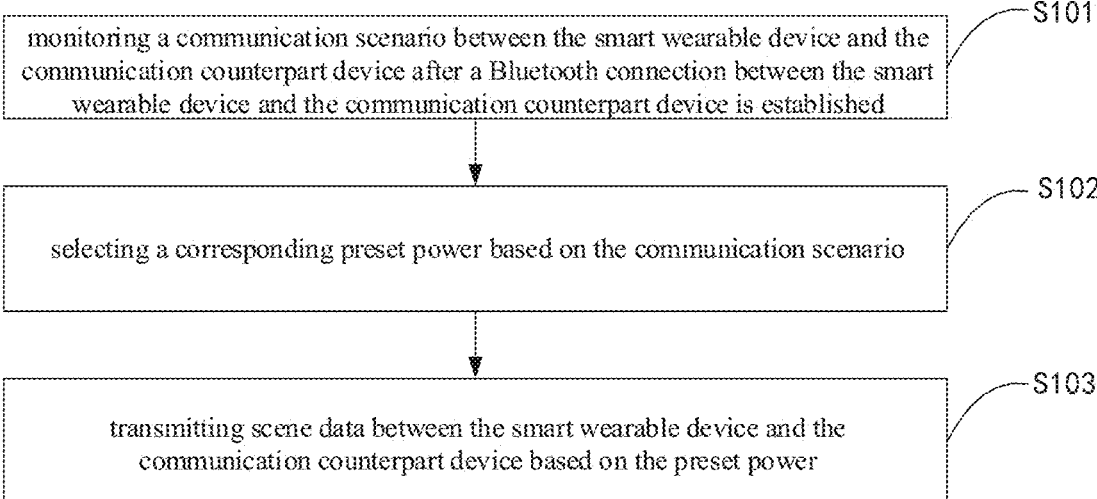
FIG. 2 is a flowchart of a communication method according to an embodiment of the present disclosure.

Referring to FIG. 2, FIG. 2 is a flowchart of a communication method according to an embodiment of the present disclosure. The communication method is applied to a smart wearable device, and the method includes the operations.

At block S101: monitoring a communication scenario between the smart wearable device and the communication counterpart device after a Bluetooth connection between the smart wearable device and the communication counterpart device is established.

The smart wearable device may be a wearable device such as a smart watch, a smart bracelet, etc. capable of communicating by wireless means such as Bluetooth. In the embodiments, a smart watch is taken as an example.

The smart watch, smart bracelet, and other smart wearable devices is capable of communicating with a communication counterpart device by means of Bluetooth, and the communication counterpart device may be an electronic device such as a Bluetooth headset, a mobile phone, a tablet computer, and other wearable Bluetooth devices.

By virtue of the technical solution of the present disclosure, the power may be controlled at the smart wearable device end, where different preset powers may be determined in response to different use scenarios, instead of the communication counterpart device controlling the power of the smart wearable device, thereby reducing the Bluetooth power consumption of the smart wearable device and improving the battery life, while avoiding the audio lag caused by inappropriate power selection.

In some embodiments, after a Bluetooth connection is established between the smart wearable device and the communication counterpart device, the communication scenario between the smart wearable device and the communication counterpart device is monitored.

The communication scenario may be pre-classified according to different levels of transmitting power when the smart wearable device communicates with the communication counterpart device. For example, the communication scenario may include: a predetermined high-power application communication scenario and a low-power application communication scenario.

The predetermined high-power application communication scenario may be a communication scenario that includes audio, for example, making phone calls, transmitting voice information, etc. When transmitting audio, a relatively high data transmission power is generally required, and since audio requires a higher transmission rate, a larger transmitting power is required, otherwise audio lagging is likely to occur.

The predetermined low-power application communication scenarios may be a communication scenario that does not include audio, for example, mobile phone standby, mobile phone transmitting information such as WeChat and SMS, or watch transmitting sports data such as heartbeat, heart rate, steps, etc. to the mobile phone. These scenarios require lower power and may be classified as the low-power application communication scenario. The non-audio communication scenarios may be subdivided based on required power levels, such as general low-power application communication scenarios and very low-power application communication scenarios, etc.

In the embodiments, different preset powers may be configured for different communication scenarios, respectively.

In some embodiments, the embodiments may further compile the power parameters of the smart wearable device into different levels according to the power emission of the smart wearable device, forming multiple predetermined power tables of different levels. Each predetermined power table may include a power range including different power parameters, and the maximum power in the power range of each predetermined power table may be set differently according to different levels. It is to be noted that the predetermined power table formed by the above scheme may include multiple different power parameters forming a power range, and the data format of the table may not be limited to a specific data format. Each power parameter in the predetermined power table is power that the smart wearable device can support for data transmission, for example, the power parameter that the smart watch can support for data transmission ranges from: 5 dbm~20 dbm. The power parameters of the smart wearable device may be compiled into different levels to form the predetermined power tables of different levels, for example, compiled into a high-level predetermined power table with a power range of: 10 dbm~20 dbm, and a low-level predetermined power table with a power range of: 5 dbm~10 dbm.

As an implementation, for example, the power parameters of the smart watch are compiled into different levels of a first-level power table, a second-level power table, and a third-level power table according to the power emission of the smart watch. The maximum power in the power range of the first-level power table is greater than the maximum power in the power range of the second-level power table, the maximum power in the power range of the second-level power table is greater than the power of the third-level power table range of the maximum power, and so on. For example, the maximum power in the power range of the first-level power table is 20 dbm, the maximum power in the power range of the second-level power table is 10 dbm, and the maximum power in the power range of the third-level power table is 5 dbm.

In some embodiments, a power table in a default state may be set for the smart wearable device, that is, the smart wearable device works with the default power table after turning on the Bluetooth function, and subsequently, the power table may be switched according to the power required for the communication scenario. The default power table may be the lowest level power table in the above power table hierarchy, such as the third-level power table.

In the above power table configuration scheme, power tables of different levels may be configured for different communication scenarios, such as the high-power application communication scenario corresponding to the first-level power table, and the low-power application communication scenario corresponding to the second-level power table.

At block S102: selecting a corresponding preset power based on the communication scenario.

At block S103: transmitting scene data between the smart wearable device and the communication counterpart device based on the preset power.

After a Bluetooth connection is established between the smart wearable device and the communication counterpart device, the communication scenario between the smart wearable device and the communication counterpart device is monitored, and the corresponding preset power is selected based on the communication scenario obtained from the monitoring.

The embodiments of the present disclosure propose a solution that can compile the power of transmitting data of the smart wearable device into power tables of different levels, where only the power table of a corresponding level can be requested for different scenarios use state. Even if some Bluetooth devices do not request data according to the rules, the transmitting power of the smart wearable device will not exceed a maximum power of the power table of the corresponding level, such that the Bluetooth power consumption of the smart wearable device may be reduced and the battery life thereof may be improved.

As an implementation, in the selecting the preset power based on the communication scenario, the following is achieved.

Taking the communication scenario including a preset communication scenario for high power applications and a communication scenario for low power applications as an example, the scheme of selecting the corresponding preset power based on the communication scenario may include the following:

selecting a corresponding first-level power table in response to the communication scenario being a predetermined high-power application communication scenario.

selecting a corresponding second-level power table in response to the communication scenario being a predetermined low-power application communication scenario, where a maximum power in a power range of the first-level power table is greater than a maximum power in a power range of the second-level power table.

In this way, by compiling the power of the smart wearable device into predetermined power tables of different levels, the power table of corresponding level is selected for different scenario usage states, thus only the power table of a corresponding level can be requested for different communication scenarios. Even if some Bluetooth devices do not request data according to the rules, the transmitting power of the smart wearable device will not exceed a maximum power of the power table of the corresponding level, such that the Bluetooth power consumption of the smart wearable device may be reduced and the battery life thereof may be improved.

In some embodiments, when the communication scenario is the predetermined high-power application communication scenario, the following scheme may be adopted to select the power.

In some embodiments, when the communication scenario is the predetermined high-power application communication scenario, such as an audio communication scenario, the default power table of the smart wearable device may be selected first, where the maximum power in the power range of the default power table is less than the maximum power in the power range of the first-level power table.

As an implementation, the default power table may be the same power table as the second-level power table.

In the current communication scenario, when the smart wearable device receives a maximum power request signal from the communication counterpart device, a scene data test packet is sent to the communication counterpart device at the maximum power in the power range of the default power table.

When the smart wearable device does not receive response data from the communication counterpart device within a predetermined time, the first-level power table corresponding to a higher level is selected.

When the smart wearable device receives the response data from the communication counterpart device within the predetermined time, the scene data is continued to be sent to the communication counterpart device at the maximum power in the power range of the default power table.

Figure 3:
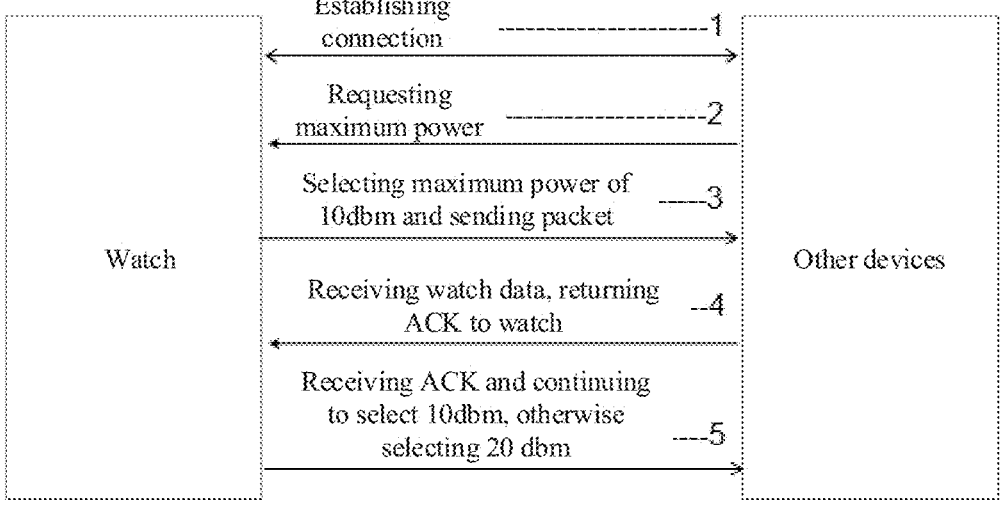
FIG. 3 is a scenario schematic view of a communication method according to an embodiment of the present disclosure.

Taking the smart watch communicating with other devices as an example, the power response flow is shown in FIG. 3.

The premise that other devices can request the maximum Bluetooth power of the watch is that the maximum Bluetooth power of the watch is visible to other devices. According to this premise, this solution can compile the power of the watch for data transmission into different power tables. Different scenario use states can only request the power of the corresponding power tables, and even if some devices do not request data according to the rules, the power used by the current scenario will not exceed the maximum power of the corresponding power table.

For example, when the watch is normally connected to other devices and there is no audio transmission, the power table A is used and the corresponding maximum power is 10 dbm, then the maximum power that other devices can request can only be 10 dbm.

When the watch has audio communication with other devices, a higher-power power table B may be used. The maximum power corresponding to the power table B is 20 dbm. However, the switch of power table must be controlled by the watch actively, not by other devices requesting control, for example: the watch of the default state is in the power table A, with the maximum power of 10 dbm, and when other devices request the maximum power to transmit, 10 dbm is selected in priority. Two packets may be sent first as an attempt. After 2 packets are sent, when other devices cannot respond thereto, the watch responds and selects the power table with higher power; when other devices respond thereto, 10 dbm is continued to be used.

In this way, through active control and switching of power tables, the Bluetooth power consumption of the smart watch may be saved and the endurance may be improved.

Afterwards, the smart wearable device transmits the scene data between the smart wearable device and the communication counterpart device based on the selected predetermined power table.

In some embodiments, a power request signal received by the smart wearable device and sent by the communication counterpart device is obtained in response to the corresponding first-level power table being selected.

The maximum power in the power range of the first-level power table is selected in response to the power request signal sent by the communication counterpart device being the maximum power request signal.

The corresponding scene data is sent to the communication counterpart device at the maximum power in the power range of the first-level power table.

In addition, the power request signal received by the smart wearable device and sent by the communication counterpart device is obtained in response to the corresponding second-level power table being selected.

The maximum power in the power range of the second-level power table is selected in response to the power request signal sent by the communication counterpart device being the maximum power request signal.

The corresponding scene data is sent to the communication counterpart device at the selected maximum power in the power range of the second-level power table.

By virtue of the above scheme, after a Bluetooth connection is established between a smart wearable device and a communication counterpart device, a communication scenario between the smart wearable device and the communication counterpart device is monitored; a corresponding preset power is selected according to the communication scenario; and scene data is transmitted between the smart wearable device and the communication counterpart device based on the preset power. By the above technical solution, the power may be controlled at the smart wearable device end, where different preset powers may be determined in response to different use scenarios, instead of the communication counterpart device controlling the power of the smart wearable device, thereby reducing the Bluetooth power consumption of the smart wearable device and improving the battery life, while avoiding the audio lag caused by inappropriate power selection.

FIG. 4 is a flowchart of a communication method according to another embodiment of the present disclosure. In the embodiments, based on the embodiments illustrated in FIG. 2 above, before the above step S101, selecting a corresponding predetermined power table according to the communication scenario, the method further includes the following.

At block S1001: obtaining power parameters of the smart wearable device.

At block S1002: compiling the power parameters of the smart wearable device into predetermined power tables of different levels.

In contrast to the embodiment illustrated in FIG. 2 above, the present embodiments further include a scheme for configuring the power tables for the smart wearable device.

In some embodiments, the embodiments may further compile the power parameters of the smart wearable device into different levels according to the power emission of the smart wearable device, forming multiple predetermined power tables of different levels. Each predetermined power table may include a power range including different power parameters, and the maximum power in the power range of each predetermined power table may be set differently according to different levels. It is to be noted that the predetermined power table formed by the above scheme may include multiple different power parameters forming a power range, and the data format of the table may not be limited to a specific data format. Each power parameter in the predetermined power table is power that the smart wearable device can support for data transmission, for example, the power parameter that the smart watch can support for data transmission ranges from: 5 dbm~20 dbm. The power parameters of the smart wearable device may be compiled into different levels to form the predetermined power tables of different levels, for example, compiled into a high-level predetermined power table with a power range of: 10 dbm~20 dbm, and a low-level predetermined power table with a power range of: 5 dbm~10 dbm.

As an implementation, for example, the power parameters of the smart watch are compiled into different levels of a first-level power table, a second-level power table, and a third-level power table according to the power emission of the smart watch. The maximum power in the power range of the first-level power table is greater than the maximum power in the power range of the second-level power table, the maximum power in the power range of the second-level power table is greater than the power of the third-level power table range of the maximum power, and so on. For example, the maximum power in the power range of the first-level power table is 20 dbm, the maximum power in the power range of the second-level power table is 10 dbm, and the maximum power in the power range of the third-level power table is 5 dbm.

In addition, a power table in a default state may be set for the smart wearable device, that is, the smart wearable device works with the default power table after turning on the Bluetooth function, and subsequently, the power table may be switched according to the power required for the communication scenario. The default power table may be the lowest level power table in the above power table hierarchy, such as the third-level power table.

Further, power tables of different levels may be configured for different communication scenarios, respectively. The communication scenarios may be pre-classified according to different levels of transmitting power when the smart wearable device communicates with the communication counterpart device. For example, the communication scenario may include: a predetermined high-power application communication scenario and a low-power application communication scenario.

The predetermined high-power application communication scenario may be a communication scenario that includes audio, for example, making phone calls, transmitting voice information, etc. When transmitting audio, a relatively high power is generally required, and since audio requires a higher transmission rate, a larger transmitting power is required, otherwise audio lagging is likely to occur.

The predetermined low-power application communication scenarios may be a communication scenario that does not include audio, for example, mobile phone standby, mobile phone transmitting information such as WeChat and SMS, or watch transmitting sports data such as heartbeat, heart rate, steps, etc. to the mobile phone. These scenarios require lower power and may be classified as the low-power application communication scenario. The non-audio communication scenarios may be subdivided based on required power levels, such as general low-power application communication scenarios and very low-power application communication scenarios, etc.

Power tables of different levels are configured for different communication scenarios, such as the high-power application communication scenario corresponding to the first level of power table, and the low-power application communication scenario corresponding to the second level of power table.

By virtue of the above scheme, power parameters of the smart wearable device are obtained; the power parameters of the smart wearable device are compiled into different levels of preset power; the communication scenario between the smart wearable device and the communication counterpart device is monitored after the smart wearable device establishes a Bluetooth connection with the communication counterpart device; the corresponding preset power is selected according to the communication scenario; the scene data is transmitted between the smart wearable device and the communication counterpart device based on the selected preset power. By the above technical solution, the power may be controlled at the smart wearable device end, where different preset powers may be determined in response to different use scenarios, instead of the communication counterpart device controlling the power of the smart wearable device, thereby reducing the Bluetooth power consumption of the smart wearable device and improving the battery life, while avoiding the audio lag caused by inappropriate power selection.

In some embodiments, the method may further include the following.

after monitoring a change in the communication scenario between the smart wearable device and the communication counterpart device, selecting a corresponding predetermined power table according to the changed communication scenario with the above power table selection rules, and transmitting the scene data between the smart wearable device and the communication counterpart device based on the predetermined power table. For the specific selection principle and data transmission scheme, reference may be made to the above embodiments, which will not be repeated herein.

In addition, the present embodiments propose a communication device, the communication device including the following elements.

A monitoring module, configured to monitor a communication scenario between the smart wearable device and the communication counterpart device after a Bluetooth connection between the smart wearable device and the communication counterpart device is established.

A selection module, configured to select a corresponding preset power based on the communication scenario.

A transmission module, configured to transmit scene data between the smart wearable device and the communication counterpart device based on the preset power.

The principle and implementation process of the present embodiments to achieve communication are referred to the above embodiments and will not be repeated herein.

In some embodiments, the present embodiments propose a terminal device, the terminal device including a memory, a processor, and a communication program stored in the memory and executable by the processor; when executed by the processor, the communication program realizes the steps of the communication method as described in the above embodiments.

Since the present communication program, when executed by the processor, employs all of the technical solutions of all of the preceding embodiments, it has at least all of the beneficial effects brought about by all the technical solutions of all the preceding embodiments, which will not be repeated herein.

In addition, the present embodiments further propose a computer-readable storage medium, the computer readable storage medium storing a communication program; when executed by the processor, the communication program realizes the steps of the communication method as described in the above embodiments.

Compared with the related art, for the communication method, apparatus, terminal device, and storage medium proposed in the present disclosure, after a Bluetooth connection is established between a smart wearable device and a communication counterpart device, a communication scenario between the smart wearable device and the communication counterpart device is monitored; a corresponding preset power is selected according to the communication scenario; and scene data is transmitted between the smart wearable device and the communication counterpart device based on the preset power. By virtue of the above technical solution, the power may be controlled at the smart wearable device end, where different preset powers may be determined in response to different use scenarios, instead of the communication counterpart device controlling the power of the smart wearable device, thereby reducing the Bluetooth power consumption of the smart wearable device and improving the battery life, while avoiding the audio lag caused by inappropriate power selection.

It should be noted that in this document, the term "including", "comprising", or any other variation thereof is intended to cover non-exclusive inclusion, such that a process, method, article, or system including a set of elements includes not only those elements, but also other elements that are not explicitly listed, or that are inherent to such process, method, article, or system. Without further limitation, an element defined by the statement "including a" does not preclude the existence of another identical element in the process, method, article, or system that includes that element.

The above numerical designation of the embodiments of the present disclosure is for descriptive purposes only and does not represent the merits of the embodiments.

From the above description of the embodiments, it is clear to those skilled in the art that the above method embodiments may be implemented with the aid of software and the necessary common hardware platform, or of course with hardware, but in many cases the former is the better implementation. Based on this understanding, the technical solution of the present disclosure, in essence, or the part that contributes to the related art, may be embodied in the form of a software product, which is stored in a storage medium (e.g., ROM/RAM, disk, CD-ROM) as described above and includes several instructions to enable a terminal device (which may be a mobile phone, computer, server, controlled terminal, or network device, etc.) to perform the method of each embodiment of the present disclosure.

The above is only some embodiments of the present disclosure, and is not intended to limit the scope of the present disclosure. Any equivalent structure or equivalent process transformation using the specification and the accompanying drawings of the present disclosure, or any direct or indirect application in other related technical fields, is included in the scope of the present disclosure.

What is claimed is:

1. A communication method, performed by a smart wearable device and comprising:

monitoring a communication scenario between the smart wearable device and the communication counterpart device after a Bluetooth connection between the smart wearable device and the communication counterpart device is established;

selecting a preset power based on the communication scenario; and transmitting scene data between the smart wearable device and the communication counterpart device based on the preset power;

wherein the communication scenario comprises a predetermined high-power application communication scenario and a predetermined low-power application communication scenario; one of case 1 and case 2 is satisfied:

in the case 1, the selecting a preset power based on the communication scenario comprises:

selecting a first-level power table in response to the communication scenario being the predetermined high-power application communication scenario; and selecting a second-level power table in response to the communication scenario being the predetermined low-power application communication scenario; wherein a maximum power in a power range of the first-level power table is greater than a maximum power in a power range of the second-level power table;

in the case 2, the selecting a preset power based on the communication scenario comprises:

selecting a default power table in response to the communication scenario being the predetermined high-power application communication scenario;

sending a scene data test packet to the communication counterpart device at a maximum power in a power range of the default power table in response to the smart wearable device receiving a maximum power request signal from the communication counterpart device; and selecting a first-level power table in response to the smart wearable device not receiving response data from the communication counterpart device within a predetermined time; wherein the maximum power in the power range of the default power table is less than a maximum power in a power range of the first-level power table.

2. The method according to claim 1, in the case 2, after the sending a scene data test packet to the communication counterpart device at the maximum power in the power range of the default power table in response to the smart wearable device receiving a maximum power request signal from the communication counterpart device, further comprising:

continuing to send the scene data to the communication counterpart device at the maximum power in the power range of the default power table in response to the smart wearable device receiving the response data from the communication counterpart device within the predetermined time.

3. The method according to claim 1, wherein in the case 1, the transmitting scene data between the smart wearable device and the communication counterpart device based on the preset power comprises:

obtaining a power request signal received by the smart wearable device and sent by the communication counterpart device in response to the first-level power table being selected;

selecting the maximum power in the power range of the first-level power table in response to the power request signal sent by the communication counterpart device being a maximum power request signal; and sending the scene data to the communication counterpart device at the maximum power in the power range of the first-level power table.

4. The method according to claim 3, wherein the transmitting scene data between the smart wearable device and the communication counterpart device based on the preset power further comprises:

obtaining the power request signal received by the smart wearable device and sent by the communication counterpart device in response to the second-level power table being selected;

selecting the maximum power in the power range of the second-level power table in response to the power request signal sent by the communication counterpart device being the maximum power request signal;

sending the scene data to the communication counterpart device at the selected maximum power in the power range of the second-level power table.

5. The method according to claim 3, wherein the default power table is the same power table as the second-level power table.

6. The method according to claim 1, in the case 1, before the selecting a preset power based on the communication scenario, further comprising:

obtaining power parameters of the smart wearable device; and compiling the power parameters of the smart wearable device into predetermined power tables of different levels.

7. The method according to claim 1, wherein in the case 1, the predetermined high-power application communication scenario is an audio communication scenario, and the predetermined low-power application communication scenario is a non-audio communication scenario.

8. The method according to claim 1, further comprising:

after monitoring a change in the communication scenario between the smart wearable device and the communication counterpart device, selecting the preset power according to the changed communication scenario and transmitting the scene data between the smart wearable device and the communication counterpart device based on the preset power.

9. A terminal device, comprising: a memory, a processor, and a communication program stored in the memory and executable by the processor; wherein when executed by the processor, the communication program realizes a communication method comprising:

monitoring a communication scenario between the smart wearable device and the communication counterpart device after a Bluetooth connection between the smart wearable device and the communication counterpart device is established;

selecting a preset power based on the communication scenario; and transmitting scene data between the smart wearable device and the communication counterpart device based on the preset power;

wherein the communication scenario comprises a predetermined high-power application communication scenario and a predetermined low-power application communication scenario; one of case 1 and case 2 is satisfied:

in the case 1, the selecting a preset power based on the communication scenario comprises:

selecting a first-level power table in response to the communication scenario being the predetermined high-power application communication scenario; and selecting a second-level power table in response to the communication scenario being the predetermined low-power application communication scenario; wherein a maximum power in a power range of the first-level power table is greater than a maximum power in a power range of the second-level power table;

in the case 2, the selecting a preset power based on the communication scenario comprises:

selecting a default power table in response to the communication scenario being the predetermined high-power application communication scenario;

sending a scene data test packet to the communication counterpart device at a maximum power in a power range of the default power table in response to the smart wearable device receiving a maximum power request signal from the communication counterpart device; and selecting a first-level power table in response to the smart wearable device not receiving response data from the communication counterpart device within a predetermined time; wherein the maximum power in the power range of the default power table is less than a maximum power in a power range of the first-level power table.

10. The terminal device according to claim 9, wherein in the case 2, after the sending a scene data test packet to the communication counterpart device at the maximum power in the power range of the default power table in response to the smart wearable device receiving a maximum power request signal from the communication counterpart device, the method further comprises:

continuing to send the scene data to the communication counterpart device at the maximum power in the power range of the default power table in response to the smart wearable device receiving the response data from the communication counterpart device within the predetermined time.

11. The terminal device according to claim 9, wherein in the case 1, the transmitting scene data between the smart wearable device and the communication counterpart device based on the preset power comprises:

obtaining a power request signal received by the smart wearable device and sent by the communication counterpart device in response to the first-level power table being selected;

selecting the maximum power in the power range of the first-level power table in response to the power request signal sent by the communication counterpart device being a maximum power request signal; and sending the scene data to the communication counterpart device at the maximum power in the power range of the first-level power table.

12. The terminal device according to claim 11, wherein the transmitting scene data between the smart wearable device and the communication counterpart device based on the preset power further comprises:

obtaining the power request signal received by the smart wearable device and sent by the communication counterpart device in response to the second-level power table being selected;

selecting the maximum power in the power range of the second-level power table in response to the power request signal sent by the communication counterpart device being the maximum power request signal;

sending the scene data to the communication counterpart device at the selected maximum power in the power range of the second-level power table.

13. The terminal device according to claim 9, in the case 1, wherein before the selecting a preset power based on the communication scenario, the method further comprises:

obtaining power parameters of the smart wearable device; and compiling the power parameters of the smart wearable device into predetermined power tables of different levels.

14. The terminal device according to claim 9, wherein the method further comprises:

after monitoring a change in the communication scenario between the smart wearable device and the communication counterpart device, selecting the preset power according to the changed communication scenario and transmitting the scene data between the smart wearable device and the communication counterpart device based on the preset power.

15. A non-transitory computer-readable storage medium, storing a communication program; wherein when executed by the processor, the communication program realizes a communication method comprising:

monitoring a communication scenario between the smart wearable device and the communication counterpart device after a Bluetooth connection between the smart wearable device and the communication counterpart device is established;

selecting a preset power based on the communication scenario; and transmitting scene data between the smart wearable device and the communication counterpart device based on the preset power;

wherein the communication scenario comprises a predetermined high-power application communication scenario and a predetermined low-power application communication scenario; the selecting a preset power based on the communication scenario comprises:

selecting a first-level power table in response to the communication scenario being the predetermined high-power application communication scenario; and selecting a second-level power table in response to the communication scenario being the predetermined low-power application communication scenario; wherein a maximum power in a power range of the first-level power table is greater than a maximum power in a power range of the second-level power table.

16. The non-transitory computer-readable storage medium according to claim 15, before the selecting a first-level power table, further comprising:

selecting a default power table in response to the communication scenario being the predetermined high-power application communication scenario; wherein a maximum power in a power range of the default power table is less than the maximum power in the power range of the first-level power table;

sending a scene data test packet to the communication counterpart device at the maximum power in the power range of the default power table in response to the smart wearable device receiving a maximum power request signal from the communication counterpart device; and performing the selecting the first-level power table in response to the smart wearable device not receiving response data from the communication counterpart device within a predetermined time.

\*    \*    \*    \*    \*